(12) United States Patent
Wiley

(10) Patent No.: US 7,263,524 B2
(45) Date of Patent: Aug. 28, 2007

(54) DATA ACCESS METHODS AND MULTIFUNCTION DEVICE THEREFOR

(75) Inventor: Jeffrey G. Wiley, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 989 days.

(21) Appl. No.: 10/033,225

(22) Filed: Oct. 25, 2001

(65) Prior Publication Data
US 2003/0084049 A1 May 1, 2003

(51) Int. Cl.
G06F 17/30 (2006.01)

(52) U.S. Cl. ..................................................... 707/10

(58) Field of Classification Search .............. 358/1.15, 358/1.14, 1.12, 1.2, 442, 468; 700/17; 707/10; 709/220, 224, 230, 204, 219, 231; 711/113, 711/114, 147
See application file for complete search history.

(56) References Cited

U.S. PATENT DOCUMENTS

| 5,532,838 | A | 7/1996 | Barbari |
| 6,002,394 | A | 12/1999 | Schein et al. |
| 6,115,747 | A | 9/2000 | Billings et al. |
| 6,175,872 | B1 | 1/2001 | Neumann et al. |
| 6,321,308 | B1* | 11/2001 | Arnon et al. ............... 711/147 |
| 6,577,907 | B1* | 6/2003 | Czyszczewski et al. ...... 700/17 |
| 2002/0075506 | A1* | 6/2002 | Stevenson et al. ......... 358/1.15 |

FOREIGN PATENT DOCUMENTS

| EP | 0917006 A2 | 5/1999 |
| GB | 2 331 383 | 5/1999 |
| GB | 2 352 071 | 1/2001 |
| GB | 2 365 556 | 2/2002 |
| GB | 2 377 583 | 1/2003 |
| JP | 5113749 A | 5/1993 |
| WO | WO99/49383 | 9/1999 |
| WO | WO 01/52477 A2 | 7/2001 |
| WO | WO 01/60048 | 8/2001 |
| WO | WO 02/15026 A1 | 2/2002 |

OTHER PUBLICATIONS

FaxPress 6.3 Information Sheet; http://www.castelle.com/products/faxpress/6.3/6.3_information.html, Jan. 4, 2003, pp. 1-10.
Search Report dated Mar. 31, 2003 from the U.K Patent Office in corresponding U.K Patent Application No. GB 0223089.4 of Hewlett-Packard Co.
Examination Report explaining relevance of Japanese reference.

* cited by examiner

Primary Examiner—Cam-Y Truong
Assistant Examiner—Fred I. Ehichioya

(57) ABSTRACT

Data access methods and multifunction device therefor. The invention is preferably embodied in computer-readable media operatively associated with a multifunction device and having computer-readable program code thereon. The computer-readable program code may comprise program code for identifying a remote storage device having the data operatively associated therewith, and program code for accessing the data operatively associated with the remote storage device from the multifunction device.

5 Claims, 4 Drawing Sheets

DATA ACCESS METHODS AND MULTIFUNCTION DEVICE THEREFOR

FIELD OF THE INVENTION

The invention generally pertains to multifunction devices, and more specifically, to methods for accessing data from multifunction devices.

BACKGROUND OF THE INVENTION

Multifunction devices (MFDs) offer a convenient way of communicating with a variety of devices from an individual stand-alone device. Briefly, multifunction devices may be used to convert paper documents to an electronic image and then to transmit the electronic image to a variety of network destinations. For example, the multifunction device may be used to send the electronic image of the paper document to an email account, a facsimile machine, a printer, a copier, an Independent Software Vendor (ISV) application, a mobile phone, and an Internet site, to name but a few such network destinations.

As an illustration, the user may send a paper document to a recipient as follows. The user positions a paper document in the automatic document feeder (ADF) or directly on the imaging bed of the multifunction device. The user then activates the multifunction device, for example, by pressing a "start" button. In turn, the multifunction device converts the paper document to an electronic image thereof. The user may identify a recipient for the electronic image of the paper document. For example, the user may identify a recipient by keying in a facsimile number, an email account, etc., using the keypad of the multifunction device 100. Or for example, the user may identify a recipient by selecting the same from a menu or address book shown on the display at the multifunction device. The multifunction device then sends the electronic image of the paper document over a suitable network (e.g., the Internet, an Intranet) to the recipient at any of a number of various network destinations.

In various circumstances, the user may want to access data while using the multifunction device. In one such circumstance, the user may want to access an address book to retrieve a recipient's address (e.g., email address, facsimile number, network address, etc.). In another such circumstance, the user may want to access a document that is already in electronic format (e.g., a word processing document, a graphics file, an audio file, etc.) and send it to the recipient from the multifunction device. For example, the user may want to combine the document that is already in electronic format with a paper document and send both documents to the recipient.

With regard to the first circumstance (i.e., allowing the user to access data contained in an address book), some multifunction devices are provided with an "on-board" or local address book. That is, the address book may be generated, modified, and then stored on suitable storage media (e.g., a hard disk drive) residing at the multifunction device. In fact, a plurality of independent address books may be maintained at a single multifunction device to allow each user to access his or her own address book. Unfortunately, however, this arrangement has several disadvantages. For example, it is common for most users to maintain more than one address book on more than one device (e.g., on personal digital assistants (PDAs), mobile phones, personal computers (PCs), etc.), thereby requiring the user to separately update the address book on the multifunction device in order to ensure that it remains current with respect to the other address books. That is, when the user adds, removes, or edits an entry in one of these other address books, the user must also add, remove, or edit the same entry in the address book that is stored separately at the multifunction device.

One method for allowing the user to more readily access several different address books is to provide the multifunction device with the ability to import the contents of the user's personal address book (e.g., from the user's PC). While such an arrangement obviates the need for the user to separately establish and/or maintain each entry of the address book stored at the multifunction device, the user must re-import the address book to the multifunction device whenever a change is made to the user's other address book(s).

Another disadvantage of providing an address book on the multifunction device is apparent when the user makes use of more than one multifunction device. For example, many businesses, or various departments within a business, may have more than one multifunction device that is available to the user for sending documents. Accordingly, the user's address book must be separately stored and maintained at each of the multifunction devices if the user is to have access to the address book data from each of the multifunction devices. Of course, establishing and maintaining identical address books on each individual multifunction device is duplicative and time consuming.

It is also apparent that, in some circumstances, it may not be worthwhile to establish an address book for some users at each multifunction device, especially when the user may only use the multifunction device on a limited basis. For example, a multifunction device may not be set up for a visitor. Or for example, a multifunction device in one department may not be set up for an employee from another department. As such, the user may not have access to his or her address book while using a particular multifunction device.

One solution to the foregoing problem has been to connect the multifunction device to a host computer, such as a network server, that is provided with the address book data in the form of a global directory. While this arrangement allows the multifunction device to retrieve address book data from the global directory without having to establish and maintain an address book on the multifunction device, it is difficult to personalize such global directories for specific users. Indeed, these global directories may only allow entries for people or entities within a particular company or organization. Thus, the user cannot use the global directory to store the addresses for personal contacts (e.g., family and friends), business-related contacts from other organizations (e.g., suppliers contractors, industry professionals, vendors), to name a few. In addition, as the global directory preferably comprises entries for many users, the global directory may become large and cumbersome to use.

With regard to the second circumstance (i.e., that of providing access from the multifunction device to data that is already in electronic format, such as a word processing document stored on the user's PC), multifunction devices suffer from the disadvantage that they are unable to access a document or other data in electronic format and transmit it to the desired recipient. For example, if the user desires to send a word processing document from the PC where it is stored, the user must first print the document, then take the printed document to the multifunction device and reconvert it to electronic format so that it may be sent using the multifunction device. These steps may result in poor image quality, and are time consuming and inconvenient for the user. In addition, the user may not be able to access data that is only available via the electronic document. For example, the user may be unable to edit the "rescanned" document without Optical Character Recognition (OCR) software, or the like. Or for example, and perhaps even more disadvantageous, where the document comprises underlying data (e.g., formulas in a spreadsheet, layers of a graphics file), the recipient will not be able to access the underlying data from the "rescanned" document.

SUMMARY OF THE INVENTION

Embodiments of the data access methods may comprise the steps of: identifying a remote storage device having the data operatively associated therewith, and accessing the data operatively associated with the remote storage device from the multifunction device.

Embodiments of a multifunction device may comprise computer-readable media operatively associated with the multifunction device and having computer-readable program code thereon. The computer-readable program code may include program code for identifying data operatively associated with a user-specified remote storage device, and program code for accessing the data operatively associated with the user-specified remote storage device from the multifunction device.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
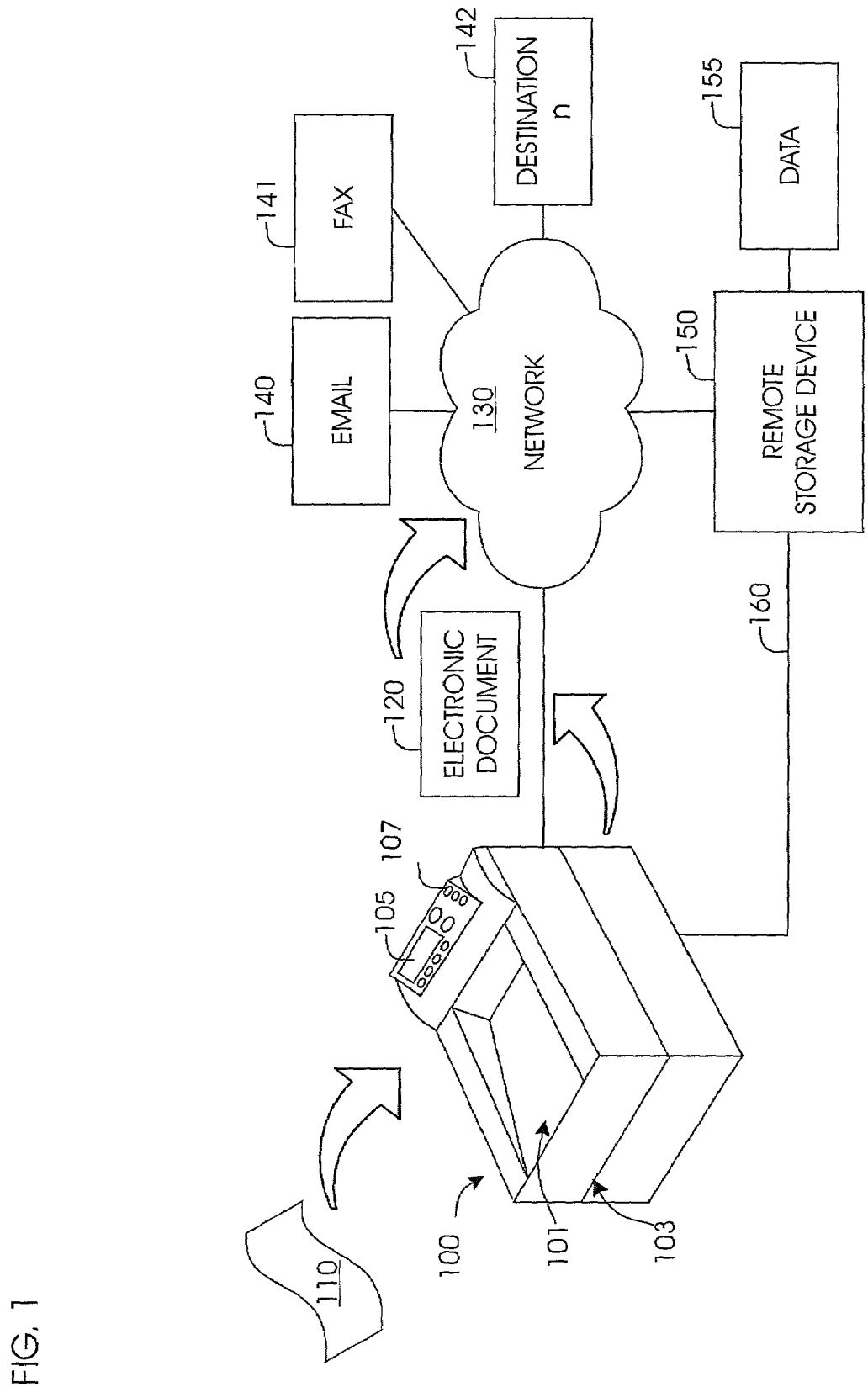
FIG. 1 is a high-level diagram illustrating an environment in which a multifunction device accesses data operatively associated with a remote storage device according to embodiments of the invention.

Multifunction device 100 (FIG. 1) is shown and described herein as it may be used to access data 155 operatively associated with a remote storage device 150 according to embodiments of the invention. Briefly, multifunction devices are a convenient means for sending documents to a recipient at any of a number of different types of devices 140-142 (e.g., a facsimile machine, an email account, etc.). As an illustration, the user may position a paper document 110 in the automatic document feeder (ADF) 101 or directly on the imaging bed 103 of the multifunction device 100, identify a recipient for the document, and activate the multifunction device 100. In turn, the multifunction device 100 converts the paper document 110 to an electronic image thereof (e.g., electronic document 120), and sends the electronic document 120 over a suitable network 130 (e.g., the Internet, an Intranet) to the recipient.

Figure 2:
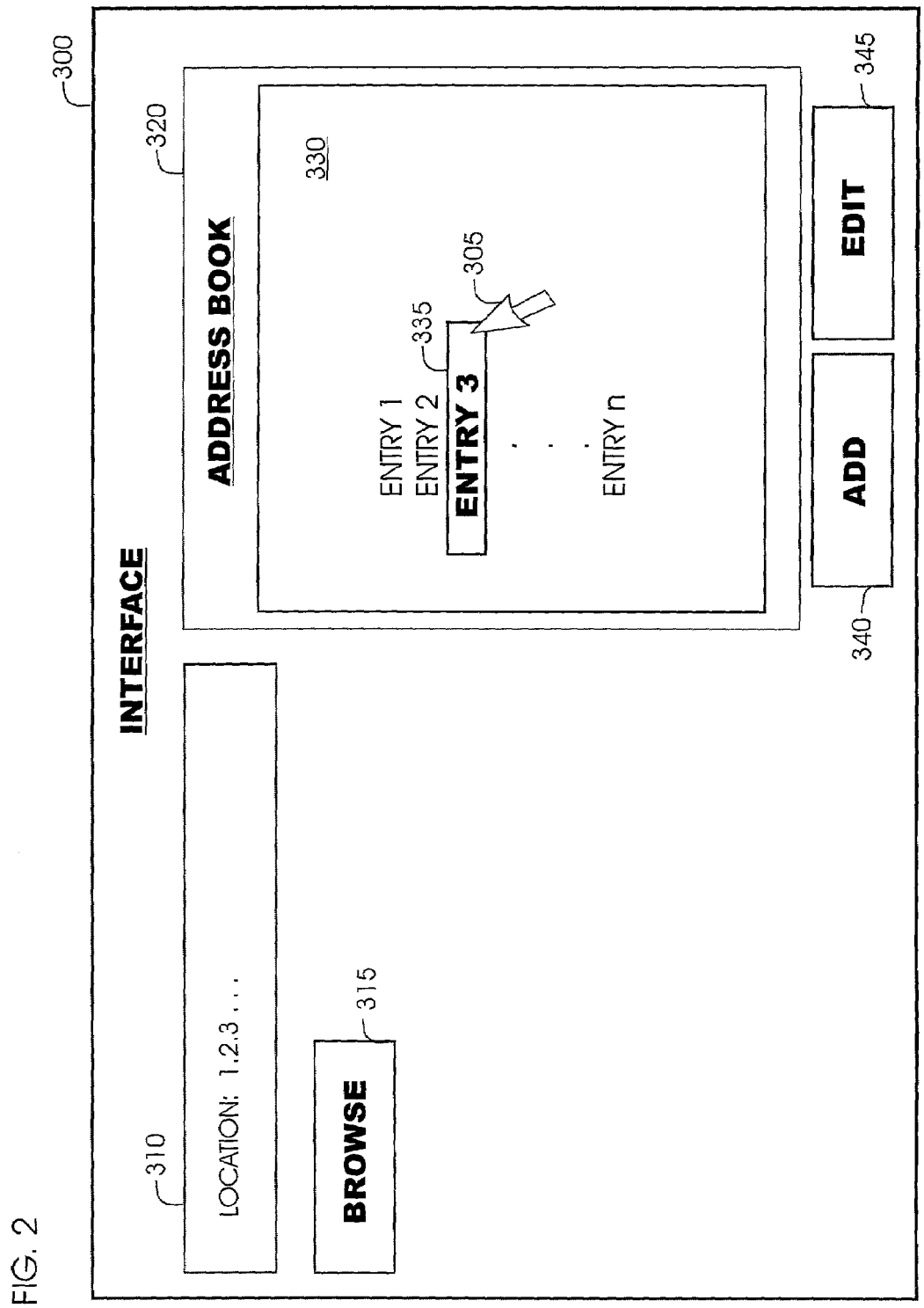
FIG. 2 illustrates an interface for accessing an address book from the multifunction device according to embodiments of the invention.

The user may also want to access other data 155 while using the multifunction device 100. For example, the user may want to retrieve the recipient's address from an address book 330 (FIG. 2). Or for example, the user may want to send the recipient a document that is already in electronic format 430 (FIG. 3), such as a word processing document stored on the user's PC. The methods and multifunction device of the present invention allows such remote data to be accessed and handled by the multifunction device as if it were stored on the multifunction device itself.

According to the teachings of the invention, a multifunction device 100 may be provided for accessing data 155 operatively associated with (i.e., residing on, or otherwise accessible from) a remote storage device 150. The multifunction device 100 may comprise computer-readable media operatively associated therewith and having computer-readable program code thereon. The computer-readable media may comprise one or more of any suitable media, as explained in more detail below. Likewise, the computer-readable program code may reside on the computer-readable media in any suitable manner, also as explained in more detail below. The computer-readable program code may include program code for identifying data 155 operatively associated with a user-specified remote storage device 150 and program code for accessing the data 155 operatively associated with the user-specified remote storage device 150 from the multifunction device 100.

The multifunction device 100 may be operated as follows for providing access to data 155 operatively associated with a remote storage device 150. The remote storage device 150 having the data 155 operatively associated therewith may be identified. For example, where the data 155 is an address book or document residing on the hard disk drive of the user's PC, the hard disk drive may be identified. In addition, the data 155 operatively associated with the identified remote storage device 150 may be accessed from the multifunction device 100. For example, the user may select one or more entries (e.g., an email account) from an address book 330 (FIG. 2) that is stored on the hard disk drive of the user's PC, for identifying the recipient of a document 110. Or for example, the user may retrieve a document 430 (FIG. 3) from the hard disk drive of the user's PC to send to a recipient from the multifunction device 100.

Accordingly, the user may access data operatively associated with remote storage devices 150 while using the multifunction device 100. For example, the user may access an address book 330 from a PC, a mobile phone, or the like. The address book 330 need not reside at any particular multifunction device 100. Therefore, the address book 330 need not be stored and separately maintained at one or more multifunction device 100 for access therefrom. In addition, the user may request access to a specific address book, and is not limited to global directories that may be available and used by a number of different users. Also for example, the user may send the recipient a document 430 (FIG. 3) that is already in electronic format from the multifunction device 100 without having to first convert the document from electronic format to paper format, and without having to reconvert the document in paper format to electronic format to access it from the multifunction device 100.

Having generally described data access methods and multifunction device therefor, as well as some of the features and advantages, the various embodiments of the invention will now be described in further detail.

A multifunction device 100 may be linked to a remote storage device 150 for accessing data 155 therefrom, according to embodiments of the invention as shown in FIG. 1. The user may make use of the multifunction device 100 to convert a "paper" document 110 to electronic format (e.g., electronic document 120) for delivery to any of the network destinations 140-142. In addition, the user may access data 155 at the remote storage device 150 over network 130, or over direct link 160. For example, the remote storage device 150 may comprise storage media at the user's PC, PDA, mobile phone, at a network server, etc. Also, for example, the data 155 may comprise the user's address book 330 (FIG. 2), a document in electronic format 430 (FIG. 3), etc.

Preferable, computer-readable media may be provided having computer-readable program code thereon for accessing the data 155 from the multifunction device 100 according to embodiments of the invention. The computer-readable media may comprise any suitable media that is now known or is later developed. For example, the computer-readable media may comprise media such as attached storage (e.g., a hard disk drive), random access memory (RAM), removable media (e.g., a compact disc (CD)), etc. In addition, it is understood that the computer-readable program code may comprise a software application, an executable file (e.g., an applet), routines, subroutines, etc. Indeed, the computer-readable program code may access other computer-readable program code for performing one or more tasks. In addition, the computer-readable program code may be stored in whole on a single computer-readable medium, or various components of the computer-readable program code may be stored on more than one computer-readable media. Preferred embodiments of the computer-readable program code are explained in more detail below.

Before continuing, the following definitions are provided to further describe the invention. The remote storage device 150 is preferably "user-specified". That is, a "user-specified" remote storage device 150 is not merely a server linked to the multifunction device 100 for general access thereto by other users, such as for accessing a global directory. Instead, the "user-specified" remote storage device 150 may be any remote storage device 150 specified by the user. The remote storage device 150 is preferably independent of the multifunction device 100, although it may reside on another multifunction device (not shown). In addition the remote storage device 150 may comprise any suitable computer-readable media (temporary, permanent, or semi-permanent). As an example, the remote storage device 150 may comprise attached media, such as random access memory (RAM), or a hard disk drive that is attached to a PC or to a network server. As another example, the remote storage device 150 may comprise removable media, such as a digital versatile disc (DVD), a compact disc (CD), tape or other magnetic storage media. Other examples of the remote storage device 150 may comprise network storage, such as a storage area network (SAN), a network attached storage (NAS) device, Internet storage, or "just a bunch of disks" (JBOD). Still other examples of the remote storage device 150 may comprise onboard or removable storage for handheld devices, such as media for use with a digital camera, a scanner, a PDA, a mobile phone, or an Internet appliance. These media are merely exemplary, and it is understood that the remote storage device 150 may comprise any other suitable media, now known, or later developed.

The data accessed according to preferred embodiments of the invention is preferably "user-requested". That is, "user-requested" data 155 is not merely a global directory accessible by a user of a multifunction device 100 that has been configured for access thereto, or other such protocol. Instead, "user-requested" data 155 is computer-readable data that is specified or requested by the user. For example, user-requested data 155 may comprise an address book (e.g., 330 in FIG. 2) maintained by the user on the user's PC. Or for example, user-requested data 155 may comprise a document (e.g., 430 in FIG. 3), such as a word processing document or the like residing on the user's PC.

In addition, the data 155 is preferably "operatively associated with" a remote storage device 150. That is, the data 155 may reside entirely on the remote storage device 150 itself. However, the data 155 may also reside on one or more other storage devices 150, and be accessed through the remote storage device 150. For example, the user may access the data 155 from a root directory stored on the remote storage device 150, which in turn retrieves the data 155 itself, or various portions thereof, from one or more other storage devices.

Furthermore, the multifunction device 100 is preferably "configured" for a user to make use thereof. That is, a "configured" multifunction device 100 is not a multifunction device 100 that is being set-up by an "administrator", in which the administrator may set-up the multifunction device for access to a global directory on a network server, or other such protocol. Instead, the configured multifunction device 100 has already been set-up by the administrator and may be used conventionally, and in addition, according to the teachings of the invention, by a "user" for accessing "user-requested" data.

In addition, the terms "paper" document and "printed" document (i.e., document 110), as used interchangeably herein, are intended to encompass any document that may be converted to electronic format using the multifunction device 100. For example, such a document may comprise photocopies, printed-paper, photographs, slides, note cards, viewgraphs, color documents, black/white documents, etc. In addition, more than one paper document 110 may be converted to electronic format. For example, one or more pages of the paper document 110 may be imaged using the ADF 101, or individually using the imaging bed 103.

Continuing now with a more detailed description of the invention, the multifunction device 100 is preferably enabled for connection to a Transmission Control Protocol/Internet Protocol (TCP/IP) network 130. However, the multifunction device 100 may be connected over any suitable network or networks, including but not limited to, a local area network (LAN), a wide area network (WAN), a secure network, an Intranet, the Internet, a telephone network, a combination thereof, etc. Likewise, the multifunction device 100 may be linked to the network 130 and/or to the remote storage device 150 in any suitable manner, including but not limited to a hardwired connection, an infrared connection, via satellite, via dial-up connection (i.e., using a modem), a dedicated connection (e.g., cable, digital subscriber line (DSL), T-1, T-3), etc.

In one preferred embodiment, the multifunction device 100 is an HP DIGITAL SENDER™ 9100C (Hewlett Packard Company, Palo Alto, Calif.). The HP DIGITAL SENDER™ 9100C is enabled for sending documents to Internet email accounts, facsimile machines, to PCs (e.g., for viewing or editing with suitable software applications), to a network folder, to a printer, etc. However, it is understood that any suitable multifunction device, now known or later developed, may be used according to the teachings of embodiments of the invention. Indeed, it is understood that in other embodiments, the multifunction device 100 may be a multifunction peripheral, a network digital copier, an "all-in-one" device for attachment to a PC, a document management machine, a network-capable digital camera, a network-capable scanner, etc. However, the multifunction device 100 is not a PC or PDA with onboard scanner, or the like.

As discussed above, the multifunction device 100 may be used to convert the document 110 to electronic format. Preferably, the document 110 is electronically imaged, and the electronic image of the paper document 110 is preferably combined with at least delivery or routing information (e.g., electronic document 120) so that it can be sent from the multifunction device 100 to the network destination 140-142 specified by the user.

More specifically, the electronic document 120 may comprise a header, a message, and an attached document. The header preferably identifies routing information for the electronic document 120, such as the recipients, the sender, and any other suitable information in any suitable format. The message may be included for conveying additional information to the recipient. Although the message may take any suitable format, it preferably includes instructional text or identifying information, much like that which may be included on a facsimile cover sheet. The attached document is preferably the electronic image of the paper document 110, and according to the teachings of the invention, may further comprise the accessed data 155. In any event, the electronic document 120 is preferably formatted so that the recipient may view it with readily-available software (e.g., ADOBE® READER®, an email application, a web browser), or so that it can be converted for output from a readily-available device (e.g., another multifunction device, a facsimile machine, a printer, a photocopier).

The various components of the electronic document 120 are preferably assembled automatically and transparently to the user. That is, the user preferably only needs to specify a recipient, position the paper document 110 in the ADF 101 or directly on the flatbed scanner 103, and activate the multifunction device 100. The multifunctional peripheral 100, using suitable program code, then images the paper document 110, includes it with the various components of the electronic document 120, and sends it to the network destination 140-142. Few, if any, additional steps are required by the user to send the document from the multifunction device 100. However, additional steps may be required when the user wants to access the data 150 from the multifunction device 100 according to embodiments of the invention, as explained in more detail below with respect to FIG. 2 and FIG. 3.

As discussed above, in some circumstances the user may want to access data 155 while using the multifunction device 100. For example, the user may want to access an address book 330 (FIG. 2) to look up or retrieve the recipient's address (e.g., an email account, a network address, etc.). According to the teachings of the invention, the user may access an address book 330 from a remote storage device 150 while using the multifunction device 100. This embodiment of the invention is more clearly illustrated with reference to FIG. 2.

According to this embodiment, an interface 300 may be provided for the user at the multifunction device 100. For example, the interface 300 may comprise a graphical user interface (GUI), such as the user may view on the display 105 of the multifunction device 100 (FIG. 1) and interact therewith using keys 103. Generally, a first window 310 is displayed for the user to specify or select the remote storage device 150 and/or the data 155 (each shown in FIG. 1).

The user may specify or select the address book 330 stored on the remote storage device 150 (e.g., the hard disk drive of the user's PC) in any suitable manner. For example, the user may enter a network address or other identification by positioning the cursor 305 in window 310 and entering the network address using keys 107 of the multifunction device 100. For example, the user may enter an Internet Protocol (IP) address to identify a hard disk drive on the user's PC. Or for example, the user may position the cursor 305 at, and "click" on the BROWSE button 315 (e.g., using a touch pad (not shown), a PC mouse (not shown), the keypad 107, or the like). The user may then select the remote storage device 150 from a list of recognized remote storage devices 150.

In one embodiment of the invention, the user may request specific data 155. For example, the user may provide the file name of an address book as part of the path in window 310. In another embodiment, the user may only specify or request a type of data 155. For example, the user may select an address book function (e.g., by pressing a key 107 corresponding to the function) at the multifunction device. According to such an embodiment, program code may be provided for searching all of the files at the corresponding remote storage device 150 and identifying compatible file types (e.g., as indicated by the file extension). Other embodiments are also contemplated as being within the scope of the invention.

Suitable program code may be provided for identifying the remote storage device 150 having the data 155 thereon, based at least in part on the user's selection. In addition, suitable program code may be provided for accessing the identified data 155. According to this embodiment, the address book 330 is preferably a computer-readable file, such as a relational database, a text or ASCII file, etc., having a number of entries defining recipients and corresponding addresses and other information therefor. As such, the program code may access the address book 330 by reading the computer-readable file. Preferably, the interface 300 may also comprise program code for displaying the accessed data 155 for the user, for example, in a second window 320. For example, a "preview" or "thumbnail" image of the accessed data 155 may be displayed for the user without having to initially transfer the accessed data 155 itself to the multifunction device 100. This feature is particularly desirable when the user does not recognize the data (e.g., a word processing document) by the filename alone and can therefore verify that the accessed data 155 is indeed what the user intends to send before sending it from the multifunction device 100.

Preferably, program code is also provided for retrieving entries (e.g., an address) from the address book 330. As an illustration, the user may select an entry 335 from the address book 330 displayed in window 320 by positioning the cursor 305 and "clicking" on the desired entry 335 therein. In FIG. 2, for example, the user has selected ENTRY 3, as shown by the boldface font and the box surrounding the selection. The user may then request that the document 110 at the multifunction device 100 be sent to the recipient identified by the selected entry 335 in the address book 330. For example, the user may position the cursor 305 and "click" on the ADD button 340. In preferred embodiments, the user may also edit (e.g., add, remove, change) an entry 335 in the address book 330 at the remote storage device 150 from the multifunction device 100. For example, the user may select this function by selecting the EDIT button 345. Other functions are also contemplated as being within the scope of the invention, and suitable program code may be provided therefor.

Also as discussed above, in some circumstances the user may want to access other data 155 while using the multifunction device 100. For example, the user may want to access a document that is already in electronic format 430 (FIG. 3) that is stored on the user's PC, and send it to the recipient. According to the teachings of the invention, the user may access data 155 from a remote storage device 150 while using the multifunction device 100, and either send the data 155 to a recipient from the multifunction device 100 by itself, or in combination with another document 110. This embodiment of the invention is more clearly illustrated with reference to FIG. 3.

According to this embodiment, an interface 300 (FIG. 3) such as was previously described with respect to FIG. 2, may again be provided for the user at the multifunction device 100. Again, the interface 300 may comprise a graphical user interface (GUI), such as the user may view on the display 105 of the multifunction device 100 (FIG. 1) and interact therewith using keys 103. Likewise, a first window 310 may be displayed for the user to specify or select the remote storage device 150 and/or the data 155 (each shown in FIG. 1).

The user may request the document 430 stored on the remote storage device 150 (e.g., the hard disk drive of the user's PC) in any suitable manner. For example, the user may enter a network address or other identification by positioning the cursor 305 in window 310 and entering the network address using keys 107 of the multifunction device 100. The user may enter an Internet Protocol (IP) address to identify a hard disk drive on the user's PC. Or for example, the user may position the cursor 305 at, and "click" on the BROWSE button 315 (e.g., using a touch pad (not shown), a PC mouse (not shown), the keypad 107, or the like). The user may then select the remote storage device 150 from a list of recognized remote storage devices 150. In any event, suitable program code may be provided for identifying the remote storage device 150 having the data 155 thereon, based at least in part on the user's request. In addition, suitable program code may be provided for accessing the identified data 155.

Figure 3:
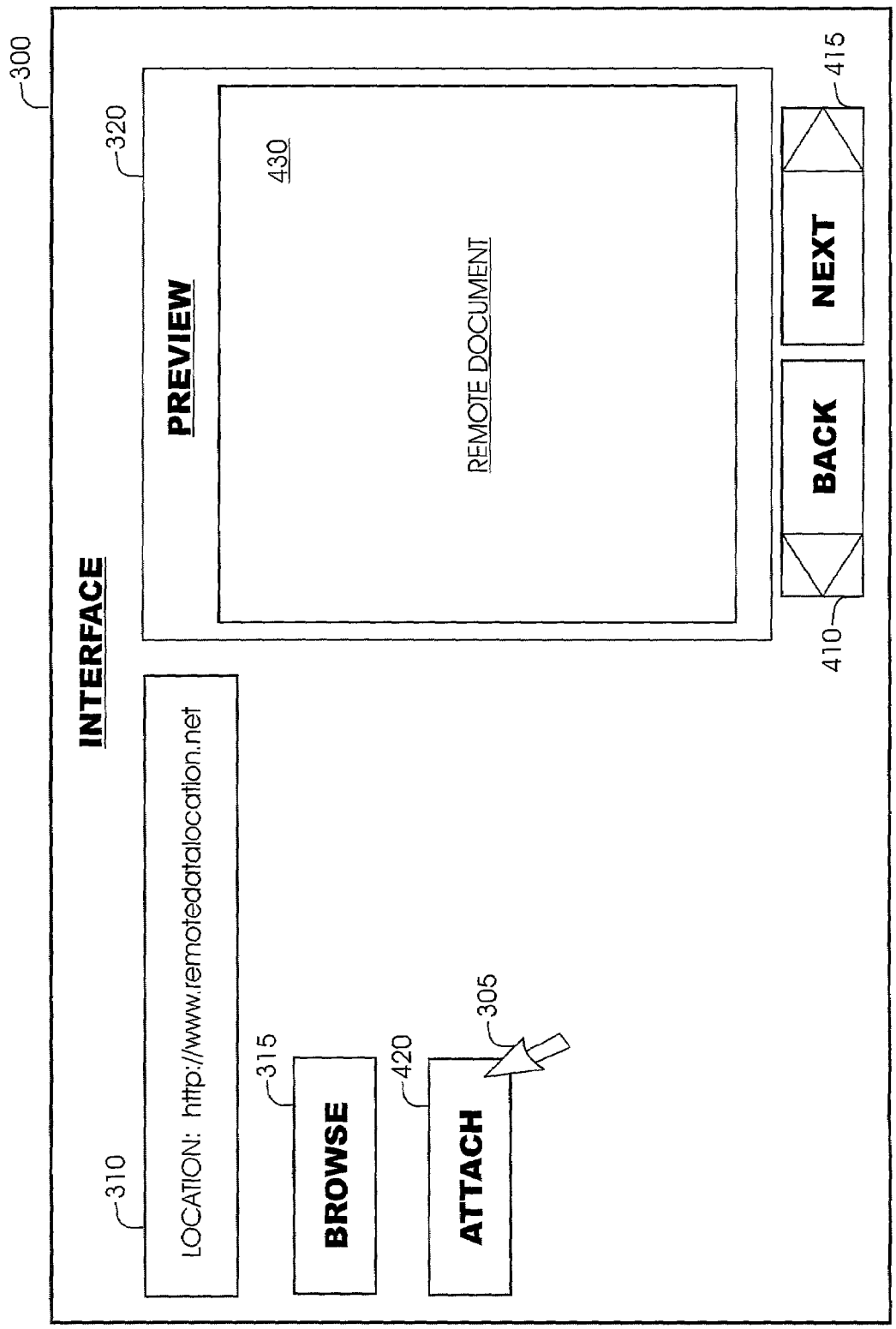
FIG. 3 illustrates another interface for accessing a document in electronic format from the multifunction device according to embodiments of the invention.

According to this embodiment, the data 155 is preferably a document that is already in electronic format 430 (FIG. 3). That is, the data 155 is preferably a computer-readable file. Although a document 430 is shown as an example of the data 155 in FIG. 3, it is understood that the data 155 may be any suitable computer-readable file, such as but not limited to, a text document, a graphics file, an audio file, etc. The user may select from one or more functions. For example, the user may select the ATTACH button 420, wherein suitable program code includes the data 155 as an attachment with a file (e.g., electronic document 120) that is being sent from the multifunction device 100. Alternately, for example, suitable program code may instead be provided to attach, or include, a link to the data (e.g., a file, document, folder, URL, etc.) when the user selects the ATTACH button 420. As such, the actual file need not be sent, although it is accessible via the link provided thereto.

The program code may access the data 155 by reading the computer-readable file. Accordingly, the accessed data 155 (or a link thereto) may be sent from the multifunction device 100 to a network destination 140-142. For example, the data 155 may be combined with another document 110. Or for example, the data 155 may be sent by itself, or included with a message from the sender, and sent to the network destination 140-142 from the multifunction device 100. In any event, the data 155 (e.g., the data itself, or a link thereto) can be sent from the multifunction device 100 in electronic format without having to first convert it to printed format.

In addition, the interface 300 may also comprise program code for displaying the accessed data 155 for the user, for example, in a second window 320 displayed at the multifunction device 100. The user may scroll through the pages of the document 430 by selecting the BACK button 410 and/or the NEXT button 415. Program code may also be provided for editing the document 430 at the multifunction device 100 and/or for performing various other functions (e.g., volume control, save file, etc.). Preferably, separate program code is provided as part of the interface 300 for displaying, editing, etc., the data 155 at the multifunction device 100. However, in other embodiments, third party software (e.g., word processing software) may be accessed for this functionality.

It is understood that the embodiments of the interface 300 shown and described above with respect to FIG. 2 and FIG. 3 are provided to illustrate various embodiments of the invention. It is not intended that the scope of the invention be limited thereto. For example, in other embodiments, the interface 300 may comprise scrolling functions. As another example, some of the windows or information contained therein may be "hidden" until a selection is made by the user. That is, the interface 300 may initially only display the first window 310 for specifying the remote storage device 150. Once the user requests data 155, the second window 320 may be displayed. In yet other embodiments, the delivery interface 300 may comprise menus, toolbars, etc. In addition, the user may define one or more default locations. For example, the user may define a default location for the user's address book (e.g., the user's PC). Thus, each time that the user logs onto the multifunction device 100, the multifunction device 100 automatically accesses the user's address book from the user's PC. Still other embodiments are also contemplated as being within the scope of the invention.

It is also understood security measures may be implemented for use with the multifunction device 100 of the invention. That is, the user may be required to logon (e.g., provide a username and password) to the multifunction device 100 and/or each network device (e.g., the user's PC) from the multifunction device 100 before the user may access data 155 therefrom. In a preferred embodiment, program code may be provided for automatically passing the user's logon information to the network device (e.g., the user's PC) from the multifunction device 100 (e.g., that was previously stored in memory). Thus, the user need not provide the logon information separately for each network device that the user is accessing (e.g., the network server, the user's PC, etc.). Other suitable security may also be implemented, such as encryption, firewalls, etc.

In other embodiments, program code may also be provided for maintaining a user profile at the multifunction device 100. The user profile may comprise links to predetermined remote storage devices 150 (e.g., those commonly or previously accessed by the user) for retrieving data 155 therefrom. For example, the user profile may comprise a link (e.g., network address and requisite logon information) to the user's address book on the user's PC, to the department server, etc. Accordingly, the user profile may be retrieved when the user logs onto the multifunction device 100 so that the user may readily access data 155 from remote storage devices 150.

An embodiment of a method for accessing data 155 from a multifunction device 100 may be illustrated with reference to FIG. 4. According to this embodiment of the method, a remote storage device 150 having the data 155 is preferably identified, as in step 500. For example, the remote storage device 150 may be identified by network Internet Protocol (IP) address, Uniform Resource Locator (URL), etc. In step 510, a link may be established between the multifunction device 100 and the remote storage device 150. For example, the multifunction device 100 may be linked through one or more networks 130 to the remote storage device 150. Or for example, the multifunction device 100 may be linked directly via link 160 to the remote storage device 150. In step 520, the user-specific data 155 may be accessed from the remote storage device 150 to the multifunction device 100 over the link established therebetween.

Figure 4:
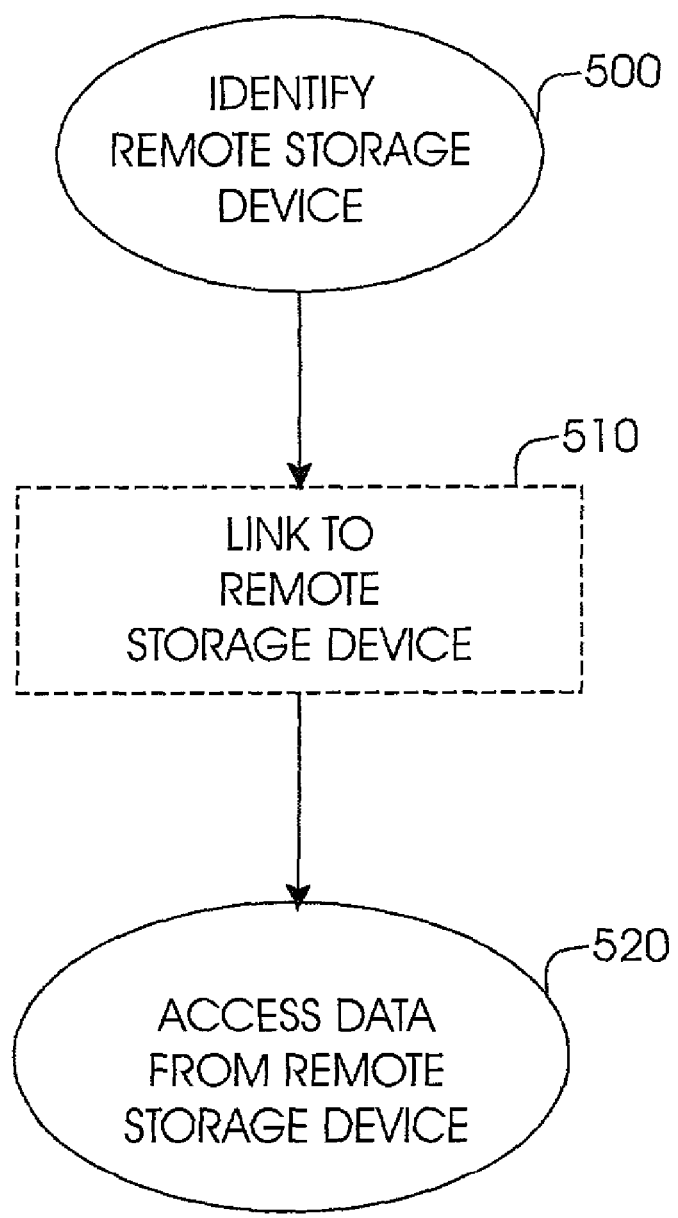
FIG. 4 is a flow chart illustrating methods for accessing data from a multifunction device according to embodiments of the invention.

Another embodiment of a method for accessing data 155 from a multifunction device 100 is also illustrated in FIG. 4. This embodiment of the method may comprise the steps of: identifying a remote storage device 150 having user-requested data 155 thereon, as in step 500; and accessing in the user-requested data at the remote storage device from a configured multifunction device 100, as in step 520.

It is understood that the steps shown and described in FIG. 4, and the examples given with respect thereto, are merely illustrative of methods for accessing data 155 from a multifunction device 100 according to the teachings of the invention. However, other embodiments of the method are also contemplated as being within the scope of the invention. Other embodiments may comprise modifications to the steps shown and/or described above. Still other embodiments may comprise additional steps. In addition, the steps shown and/or described above need not be performed in any given order. For example, one or more of the steps 500, 510, 520 (FIG. 4) may be performed before, after, or simultaneously with an additional step of the multifunction device 100 converting a document 110 to electronic format. Furthermore, it is understood that the same steps may be performed in more than one manner according to various embodiments of the invention.

What is claimed is:

1. A method for providing access from a multifunction device to an electronic document at a user-specified remote storage device, comprising:
   identifying said user-specified remote storage device having said electronic document based at least in part on a path thereto specified by a user at said multifunction device;
   establishing a link between said multifunction device and a user-specified remote storage device having said electronic document;
   accessing said electronic document at said user-specified remote storage device from said multifunction device over said link established therebetween;
   sending said electronic document from said multifunction device;
   converting a document to electronic format at said multifunction device; and
   combining said document in electronic format with said electronic document from said user-specified remote storage device.

2. A method for providing access from a multifunction device to an electronic document at a user-specified remote storage device, comprising:
   identifying said user-specified remote storage device having said electronic document based at least in part on a path thereto specified by a user at said multifunction device;
   establishing a link between said multifunction device and a user-specified remote storage device having said electronic document;
   accessing said electronic document at said user-specified remote storage device from said multifunction device over said link established therebetween;
   combining said accessed data said electronic document from said user-specified remote storage device with an electronic document generated at said multifunction device; and
   sending said combined electronic documents from said multifunction device to a network destination.

3. A method for accessing user-requested data from a configured multifunction device, comprising:
   identifying a remote storage device having a user-requested document based at least in part on a path for said remote storage device specified by a user at said configured multifunction device; and
   retrieving said user-requested document from said configured multifunction device;
   converting a document to electronic format at said configured multifunction device; and
   combining said document in electronic format with said retrieved user-requested document.

4. A method for accessing user-requested data from a configured multifunction device, comprising:
   identifying a remote storage device having a user-requested document based at least in part on a path for said remote storage device specified by a user at said configured multifunction device; and
   retrieving said user-requested document from said configured multifunction device;
   combining said retrieved user-requested document with an electronic document generated at said configured multifunction device; and
   sending said combined electronic document and retrieved user-requested document from said configured multifunction device to a network destination.

5. A multifunction device comprising:
   computer-readable media operatively associated with said multifunction device and having computer-readable program code thereon including program code for identifying data operatively associated with a user-specified remote storage device; and
   program code for accessing said data operatively associated with said user-specified remote storage device from said multifunction device;
   wherein said computer-readable media further comprises:
   program code for combining a document in electronic format with a document image at said multifunction device;
   program code for sending said combination of said document in electronic format and said document image from said multifunction device to a network destination.

* * * * *